United States Patent [19]

Herczeg et al.

[11] Patent Number: 4,680,198

[45] Date of Patent: Jul. 14, 1987

[54] METHOD OF PRODUCING A SCRATCH RESISTANT COATING ON A SHEET OF THERMOPLASTIC MATERIAL

[75] Inventors: Julius-Ludwig Herczeg, Bolligen; Martin Lenhard, Ittigen; Ernst Flückiger, Toffen, all of Switzerland

[73] Assignee: Gurit-Worbla AG, Ittigen, Switzerland

[21] Appl. No.: 753,862

[22] Filed: Jul. 11, 1985

[30] Foreign Application Priority Data

Jul. 13, 1984 [CH] Switzerland .................. 3412/84

[51] Int. Cl.⁴ .............................................. B05D 5/06
[52] U.S. Cl. ................................. 427/164; 427/54.1; 427/209; 427/370; 427/371
[58] Field of Search ............... 427/164, 54.1, 209, 427/370, 371, 399; 428/413, 451, 510

[56] References Cited

U.S. PATENT DOCUMENTS

| | | | |
|---|---|---|---|
| 2,027,688 | 1/1936 | Hagedorn | 427/399 |
| 2,589,567 | 3/1952 | Nickerson | 427/370 |
| 3,019,131 | 1/1962 | Haas | 427/164 |
| 3,081,192 | 3/1963 | Idelson | 427/164 |
| 3,131,088 | 4/1964 | Festag | 427/370 |
| 4,124,672 | 11/1978 | Jarsen | 427/164 |
| 4,199,421 | 4/1980 | Kamada et al. | 427/164 |
| 4,397,923 | 8/1983 | Yasuda et al. | 427/164 |
| 4,544,572 | 10/1985 | Sandvig | 427/164 |

*Primary Examiner*—Norman Morgenstern
*Assistant Examiner*—Janyce A. Bell
*Attorney, Agent, or Firm*—Burns, Doane, Swecker & Mathis

[57] ABSTRACT

A three-dimensionally crosslinkable resin is applied to a sheet of thermoplastic material, and cured to form a scratch resistant coating on the sheet. The coated sheet is then subjected to the action of heat and uniform area pressure between polished surfaces. This pressing treatment results in an optically smooth surface of the coating.

7 Claims, No Drawings

METHOD OF PRODUCING A SCRATCH RESISTANT COATING ON A SHEET OF THERMOPLASTIC MATERIAL

Unprotected surfaces of elements consisting of a thermoplastic material generally have insufficient scratch resistance, they easily become scratched in use, whereby their transparency is impaired.

The degree of scratch resistance can be judged using the sand spray test according to German Industry Standard DIN 52348 followed by a determination of the relative luminance coefficient according to German Industry Standard DIN 4646/2.

For helmet visors, for example, German Industry Standard DIN 58218 requires a value of $$<5 \frac{cd}{m^2 \cdot lx}$$

for the relative luminance coefficient.

Thin coatings have been used in the prior art for protecting the surfaces of thermoplastic elements against scratching.

U.S. Pat. No. 3,451,838, for example, discloses a method using heat curable polysiloxanes.

German Pat. No. 20 58 504 describes a coating method in which a polyurethane is used as a soft coating.

In German patent application No. 29 28 512 UV curable lacquers, such as acrylic resin lacquers, are proposed for coating thermoplastic materials.

The last-mentioned method for producing scratch resistant coatings of UV cured acrylic resins has proved to be the simplest, cleanest and most economic method in practice: It does, among other things, not require any solvents.

Unfortunately, however, it is found that solvent-free, UV curable lacquers, applied to materials in sheet or web form by any of the presently conventional coating techniques, will result in an optically insufficient surface of the cured coating.

An optically perfect surface quality is, however, indispensable for a variety of uses.

It is therefore an aim of the present invention to improve a method for producing a scratch resistant coating on a sheet of thermoplastic material, in which a three-dimensionally crosslinkable resin, such as a UV curable acrylic resin, is applied to the sheet and then cured, in such a way that an optically perfect surface of the coating is obtained.

This aim can surprisingly be achieved in a simple and effective manner, according to the present invention, by subjecting the coated sheet, after the curing of the resin, to the action of heat and uniform area pressure (as opposed to line pressure between calendar rollers, for example) between polished pressing surfaces to obtain an optically smooth surface of the coating.

Although the curing will, of course, result in a three-dimensionally crosslinked system it has been found, surprisingly, that the method according to this invention, carried out by means of a conventional daylight press or of a continuous laminator press, for example, will produce the optical quality or smoothness required for many applications, even if the coating has been applied by conventional coating techniques.

Scratch resistant coatings having perfect optical qualities and smoothness can be produced by the method according to the invention on one surface or on both surfaces of flexible or rigid sheets made of a variety of thermoplastic materials.

Best results are obtained if the treatment temperatures in the press are clearly above the glass transition temperature of the thermoplastic material in each particular case.

It is easily possible, for example, on a cellulose propionate sheet coated with a UV curable acrylic resin, after curing the coating and then pressing between polished surfaces, to obtain an optically perfect surface of the coating with a scratch resistance of $$3.2 \frac{cd}{m^2 \cdot lx}$$

according to the German Industry Standards mentioned above.

EXAMPLE 1

A cellulose propionate sheet, 1 mm thick, was coated with a UV curable lacquer, using any suitable conventional coating technique. The lacquer had the following composition:

45% weight epoxide acrylate (Ebecryl 608 ®)
2% by weight silicone acrylate (IRR 49 ®)
45% by weight hexandiole diacrylate
4% by weight benzophenone
4% by weight photosensitizer Darocure ® (=1-phenyl-2-hydroxy-2-methyl-propane-1-one)

The sheet was then irradiated, at a web speed of 10 meters/minute, in a UV irradiation device equipped with a 80 W/cm IST radiator.

The cured lacquer layer had an optically unsatisfactory surface. To improve the surface, the sheet was then pressed in a conventional daylight press between polished pressing plates, or in a conventional continuous laminator press between polished bands, with a uniform area pressure of 30 bar and at a temperature of 150° C.

An optically perfect surface resulted, having a scratch resistance of $$3.2 \frac{cd}{m^2 \cdot lx}$$

according to German Industry Standard DIN 58218.

EXAMPLE 2

A coated, irradiated and pressed sheet prepared as described in Example 1 was treated in a saponification bath. The bath was comprised of an alkaline solution containing at least 40% by volume of total solvent of a protic and/or of a dipolar aprotic solvent. For example, the solvent contained 40 grams of NaOH and 630 milliliters of methanol per one liter of water. The treatment resulted in a cellulose layer on the uncoated surface of the sheet.

A comprehensive evaluation of the effects produced by the pressing treatment according to the invention is not possible by optical measurements alone, such as measurements of light scattering and refraction. The effect is made clear, however, by a visual judgement of the transparency and of the surface of the coated sheet.

In addition, the effect of the pressing treatment according to the invention is also clearly shown by roughness measurements according to German Industry Standard DIN 4768 which have been effected on the coating surface. The results are shown in the following table where the roughness values before the pressing treatment are indicated at a, whereas the roughness values after the pressing treatment are indicated at b.

TABLE

| Sheet material | | Roughness value Ra ($\mu$m) | Roughness value Rz ($\mu$m) |
| --- | --- | --- | --- |
| Cellulose acetobutyrate | a | 0.14 | 0.53 |
| | b | 0.01 | 0.13 |
| Hard polyvinylchloride | a | 0.18 | 0.80 |
| | b | 0.03 | 0.10 |

What is claimed is:

1. In a method of producing a scratch resistant coating on a sheet of thermoplastic material comprising the steps of applying a three-dimensionally crosslinkable resin to the sheet, curing and subjecting the coated sheet, after the curing of the resin, to the action of heat and uniform area pressure between polished surfaces to obtain an optically smooth surface of the coating.

2. The method of claim 1 further comprising effecting treatment between the polished surfaces at a temperature between the glass transition temperature and the softening temperature of said thermoplastic material.

3. The method of claim 1 further comprising using a daylight press for generating said uniform area pressure.

4. The method of claim 1 further comprising using a continuous laminator press for generating said uniform area pressure.

5. A method according to claim 1, in which both surfaces of the sheet are coated with the three-dimensionally crosslinkable resin.

6. A method according to claim 1, in which only one of the two surfaces of the sheet is coated with the three-dimensionally crosslinkable resin.

7. A method according to claim 6, in which said thermoplastic material is a cellulose ester, and wherein the other one of the two surfaces of the sheet is treated with an alkaline saponifying solution.

* * * * *